US012564878B2

(12) United States Patent
Yatsukura et al.

(10) Patent No.: US 12,564,878 B2
(45) Date of Patent: Mar. 3, 2026

(54) ALUMINUM MOLDED BODY AND METHOD FOR PRODUCING SAME

(71) Applicants: NIPPON LIGHT METAL COMPANY, LTD., Tokyo (JP); TOYO ALUMINIUM KABUSHIKI KAISHA, Osaka (JP)

(72) Inventors: Masato Yatsukura, Tokyo (JP); Takashi Nagao, Shizuoka (JP); Tsuguharu Tashiro, Shizuoka (JP); Jun Kusui, Osaka (JP)

(73) Assignees: NIPPON LIGHT METAL COMPANY, LTD., Tokyo (JP); TOYO ALUMINIUM KABUSHIKI KAISHA, Osaka (JP)

( * ) Notice: Subject to any disclaimer, the term of this patent is extended or adjusted under 35 U.S.C. 154(b) by 603 days.

(21) Appl. No.: 17/919,815

(22) PCT Filed: Apr. 13, 2021

(86) PCT No.: PCT/JP2021/015328
§ 371 (c)(1),
(2) Date: Oct. 19, 2022

(87) PCT Pub. No.: WO2021/215306
PCT Pub. Date: Oct. 28, 2021

(65) Prior Publication Data
US 2024/0035122 A1 Feb. 1, 2024

(30) Foreign Application Priority Data

Apr. 21, 2020 (JP) ................................. 2020-075735
Apr. 23, 2020 (JP) ................................. 2020-076883

(51) Int. Cl.
| | |
|---|---|
| *C22C 21/00* | (2006.01) |
| *B22F 1/00* | (2022.01) |
| *C22C 1/04* | (2023.01) |
| *B33Y 10/00* | (2015.01) |
| *B33Y 80/00* | (2015.01) |

(52) U.S. Cl.
CPC .............. *B22F 1/00* (2013.01); *C22C 1/0416* (2013.01); *C22C 21/00* (2013.01); *B33Y 10/00* (2014.12); *B33Y 80/00* (2014.12)

(58) Field of Classification Search
CPC ......... C22C 21/02; C22C 21/06; C22C 21/08; C22C 21/10; C22C 21/14; C22C 21/16; C22C 1/0416; C22C 21/00; B33Y 10/00; B33Y 80/00; C22F 1/04; B22F 10/28; B22F 1/00
See application file for complete search history.

(56) References Cited

FOREIGN PATENT DOCUMENTS

WO     WO-2018198534 A1 * 11/2018 .............. B22F 10/10
WO     WO-2020081150 A1 * 4/2020 ................ C22F 1/04

OTHER PUBLICATIONS

English Abstract and English Machine Translation of Sugahara et al. (WO 2017-203717 A1) (Nov. 30, 2017).*
English Abstract and English Machine Translation of Adachi et al. (WO 2018/198534) (Nov. 1, 2018).*

* cited by examiner

*Primary Examiner* — Jessee R Roe
(74) *Attorney, Agent, or Firm* — RANKIN, HILL & CLARK LLP

(57) ABSTRACT

The present invention provides an aluminum molded body having high thermal conductivity as well as higher strength than a rolled material, and a method for producing the aluminum molded body. More specifically, provided are an aluminum molded body having a thermal conductivity of 180 W/mK or higher and higher strength than a rolled material of the same composition, and a method with which it is possible to efficiently produce the aluminum molded body even when the shape thereof is complex. An aluminum layered molded body obtained by molding through an additive manufacturing method according to the present invention is characterized in that: an aluminum material containing 0.001-2.5 mass % of a transition metal element that forms a eutectic with Al, the balance being Al and unavoidable impurities, is used as a raw material; and the thermal conductivity is 180 W/mK or higher.

9 Claims, 5 Drawing Sheets

ALUMINUM MOLDED BODY AND METHOD FOR PRODUCING SAME

TECHNICAL FIELD

The present invention relates to an aluminum molded body and a method for producing the same, and more specifically, relates to an aluminum laminated molded body that can be suitably used as a member that is required to have high thermal conductivity and higher mechanical properties than a rolled material, and an efficient production method therefor.

PRIOR ARTS

Aluminum has excellent thermal conductivity in addition to high specific strength, so it is used as transportation equipment such as electric vehicles and aircraft, and heat sink materials for LED lighting, and various types of electronic electric equipment.

However, while the heat generation density is increasing with the further increase in output and miniaturization of storage batteries and power devices, since the thermal conductivity of aluminum is about half that of copper, further improvement in thermal conductivity is desired. Further, mechanical properties are also important from the viewpoint of reliability of structural members, and it is necessary to realize high strength together with improving thermal conductivity.

On the other hand, for example, in Patent Literature 1 (Japanese Unexamined Patent Publication No. 2013-204087), there are disclosed an aluminum alloy member having high strength such that the tensile strength is 200 MPa or more at room temperature and a thermal conductivity of 145 W/mK or more is characterized in that it includes 8 mass % (hereinafter %)<Si<11%, 0.2%<Mg<0.3%, 0.3%<Fe<0.7%, 0.15%<Mn<0.35%, 1<Fe+Mn×2, 0.005%<Sr<0.020%, Cu<0.2%, Zn<0.2%. and balance being Al and unavoidable impurities, and that it is kept at 200° C.<T<250° C. for 0.1 to 1 hour after casting and a production method therefor.

In the aluminum member and the production method therefor described in Patent Literature 1, it is said that it has been found that the member shows the tensile strength at room temperature of as high as 200 MPa or more and the thermal conductivity of as high as 145 W/mK or more by ensuring the fluidity and improving the seizure prevention by optimizing the composition containing impurities, and by shortening the heat treatment time by improving the thermal conductivity due to eutectic Si granulation after casting.

Further, in Patent Literature 2 (Japanese Unexamined Patent Publication No. 2014-209502), there is disclosed a pre-coated aluminum plate for an on-vehicle LED lighting heat sink including an aluminum plate, a base treatment film, and a resin-based film, wherein, in the pre-coated aluminum plate for an on-vehicle LED lighting heat sink, the aluminum plate has heat conductivity of 150 W/mK or more, the resin-based film contains a thermosetting resin and a black pigment component, and the film thickness of the resin-based film is 5 to 15 μm, the arithmetic average roughness Ra of the surface of the resin-based film is 0.5 to 3 μm, and the resin-based film has an integrated radiation coefficient of 0.80 or more at 25° C. in an infrared region having a wavelength of 3 to 30 μm.

In the heat conductive aluminum alloy described in Patent Literature 2, it is said that it is possible to provide an excellent pre-coated aluminum plate for an on-vehicle LED lighting heat sink, in order to reduce the heat resistance of the material, by setting the heat conductivity of the aluminum plate to a certain level or higher, by forming the black film on the surface of the molded body made of the aluminum plate to increase the radiation coefficient, by making the film relatively thin to reduce the heat resistance of the film, and by appropriately controlling the surface roughness of the film to increase the radiation rate, thereby improving heat dissipation.

CITATION LIST

Patent Literature

Patent Literature 1: Japanese Patent Unexamined Publication No. 2013-204087
Patent Literature 2: Japanese Patent Unexamined Publication No. 2014-209502

SUMMARY OF THE INVENTION

Technical Problem

The most important matter in the heat sink material is thermal conductivity, but it is 145 W/mK or more for the aluminum alloy member of Patent Literature 1 and 150 W/mK or more for the aluminum plate material of the pre-coated aluminum plate for on-vehicle LED lighting heat sink of Patent Literature 2.

With the increase in heat generation density described above, improvement of the cooling function of the heat sink is required, but these thermal conductivities are insufficient.

Further, members which utilize the thermal conductivity of aluminum often have a complicated shape, and in addition to being able to easily and efficiently form the member shape, it is necessary that they also have high strength that can withstand practical use.

In view of the above problems in the prior art, an object of the present invention is to provide an aluminum molded body having high thermal conductivity and high strength as compared with a rolled material, and a method for producing the same. More specifically, the object is to provide an aluminum molded body having a thermal conductivity of 180 W/mK or more and having high strength as compared with the rolled material having the same composition, and a method for efficiently producing the aluminum molded body, even when it has a complicated shape.

Solution to Problem

As a result of the intensive study on an aluminum molded body and a method for producing the same in order to achieve the above object, the present inventors have found that it is extremely effective to obtain an aluminum laminated molded body, which is molded by an additive manufacturing method, where an aluminum material containing a slight amount of a transition metal element forming a eutectic crystal with aluminum is used as a raw material, and have reached the present invention.

Namely, the present invention provides an aluminum molded body,
which is an aluminum laminated molded body molded by an additive manufacturing method,
which is characterized in that:
a raw material therefor is an aluminum material containing 0.001 to 2.5% by mass of a transition metal element that forms a eutectic crystal with Al, with the remainder being Al and unavoidable impurities; and a thermal conductivity thereof is 180 W/mK or more.

In the aluminum molded body of the present invention, it is preferable that the transition metal element is Fe. Examples of the other transition metal element include Ni and Co. Hereinafter, in the aluminum molded body of the present invention, the case where the transition metal element is Fe will be mainly described.

When quenching and solidifying an aluminum material containing 0.001 to 2.5% by mass of Fe by an additive manufacturing method, a large amount of extremely fine AlFe-based compounds having an average particle size of 20 to 100 nm are preferably dispersed in the aluminum molded body of the present invention. Here, the boundary region of the melt pool means a region where the distance from the boundary of the melt pool is up to 5 μm. Further, the aluminum molded body of the present invention is molded by an additive manufacturing method, and can be an arbitrary shape such as a complicated shape, or a hollow structure. The shape and size of the aluminum material may be appropriately selected according to the additive manufacturing method to be used, and a powdered aluminum material or a wire-shaped aluminum material can be preferably used.

Further, since the aluminum molded body of the present invention is obtained by an additive manufacturing method and is formed by joining many quenched and solidified regions, in the molded body, as a whole, a distribution of the elements is more uniform than that of a casting or the like. As a result, extremely fine AlFe-based compounds are uniformly dispersed in a large amount throughout the aluminum molded body.

Examples of the unavoidable impurities in the aluminum molded body of the present invention include Si, Cu, Mn, Mg, Zn, Cr and Ti.

In the aluminum molded body of the present invention, it is preferable that a thermal conductivity is 190 W/mK or more. The more preferable thermal conductivity is 200 W/mK or more, the most preferable thermal conductivity is 210 W/mK or more. In the aluminum molded body of the present invention, since Fe forms a fine AlFe-based compound, Fe is homogeneously removed from the aluminum base material. In addition, the strain of the aluminum base material is significantly reduced in the process of forming the AlFe-based compound, and thus, the high thermal conductivity is realized by these effects.

Further, in the aluminum molded body of the present invention, it is preferable that the Vickers hardness is 30 to 90 HV. The more preferable Vickers hardness is 40 to 90 HV, and the most preferable Vickers hardness is 50 to 90 HV. Although the thermal conductivity is improved by heat-treating the aluminum molded body, the mechanical properties such as Vickers hardness are lowered when the AlFe-based compound is coarsened. Here, in order to achieve both thermal conductivity and Vickers hardness at high values, the Vickers hardness is preferably 30 to 65 HV, more preferably 40 to 65 HV, and most preferably 50 to 65 HV.

Further, in the aluminum molded body of the present invention, it is preferable that the decrease in Vickers hardness when kept at 400 to 500° C. for 1 hour is 5 HV or less. The aluminum molded body of the present invention has good thermal stability due to the uniform dispersion of the fine AlFe-based compounds. Since the decrease in Vickers hardness when held at 400 to 500° C. for 1 hour is 5 HV or less, it is possible to be suitably used even in applications where keeping at a high temperature.

Furthermore, the aluminum molded body of the present invention preferably has tensile strength: 100 MPa or more, 0.2% proof stress: 75 MPa or more, and elongation: 5% or more. The more preferable tensile strength is 150 MPa or more, and the most preferable tensile strength is 200 MPa or more. Further, the more preferable 0.2% proof stress is 100 MPa or more, and the most preferable 0.2% proof stress is 150 MPa or more. Furthermore, the more preferable elongation is 10% or more, and the most preferable elongation is 15% or more. In the aluminum molded body of the present invention, since the extremely fine AlFe-based compounds are uniformly dispersed, the aluminum molded body has excellent tensile properties as compared with a rolled material having the same composition. Since the aluminum molded body has these tensile properties, it is possible to be suitably used in applications where strength and reliability are required.

Further, the present invention also provides a method for producing an aluminum molded body, which is characterized by including, a lamination molding step of molding an aluminum material containing 0.001 to 2.5% by mass of a transition metal element which forms a eutectic crystal with Al, with the remainder being Al and unavoidable impurities by an additive manufacturing method to obtain an aluminum laminated molded body; and a heat treatment step of holding the aluminum laminated molded body at 325 to 525° C. to precipitate a compound composed of Al and the transition metal element and to reduce residual stress.

In the method for producing the aluminum molded body of the present invention, it is preferable that the transition metal element is Fe. Examples of the other transition metal element include Ni and Co. Hereinafter, in the method for producing the aluminum molded body of the present invention, the case where the transition metal element is Fe will be mainly described.

When molding an aluminum material containing 0.001 to 2.5% by mass of Fe by an additive manufacturing method, a quenched and solidified structure made of an aluminum base material in which the Fe is solid-dissolved is formed, and then when maintaining the temperature at 325 to 525° C., it is possible to precipitate the AlFe-based compound further and to reduce the residual stress. When setting the heat treatment temperature to 325° C. or higher, the AlFe-based compound can be sufficiently precipitated to surely improve the thermal conductivity of the aluminum molded body. Further, when setting the heat treatment temperature to 525° C. or lower, it is possible to suppress coarsening of the AlFe-based compound and prevent reducing of mechanical properties such as Vickers hardness of the aluminum molded body.

For example, in case that the Fe content is approximately 1.0% by mass, the thermal conductivity can be 180 W/mK or more by setting the heat treatment temperature to 325° C. or higher, and the Vickers hardness can be 40 HV or more by setting the heat treatment temperature can be set to 525° C. or lower.

Further, the additive manufacturing method is not particularly limited as long as the effect of the present invention is not impaired, and various conventionally known additive manufacturing methods can be used. The additive manufacturing method is a method capable of obtaining a molded body having a desired shape by depositing a raw metal, and examples thereof include a powder bed melt-bonding method and a directed energy deposition method. Further, the heat source for melting the raw metal is not particularly limited as long as the effect of the present invention is not impaired, and various conventionally known heat sources can be used, and for example, a laser or an electron beam can be preferably used.

Effects of the Invention

According to the present invention, it is possible to provide an aluminum molded body having high thermal conductivity and high strength as compared with a rolled material, and a method for producing the same. More specifically, it is possible to provide an aluminum molded body having a thermal conductivity of 180 W/mK or more and having high strength as compared with the rolled material having the same composition, and a method for efficiently producing the aluminum molded body, even when it has a complicated shape.

EMBODIMENTS FOR ACHIEVING THE INVENTION

Hereinafter, representative embodiments of the aluminum molded body, and the producing method thereof according to the present invention will be described in detail with reference to the drawings, but the present invention is not limited to only these examples. Further, the elements in the embodiment can be optionally combined with a part or the whole. In the following description, the same or equivalent parts are denoted by the same numerals, and there is a case that redundant explanation may be omitted. In addition, since the drawings are for conceptually explaining the present invention, dimensions of the respective constituent elements expressed and ratios thereof may be different from actual ones.

1. Aluminum Molded Body

The aluminum molded body of the present invention is an aluminum laminated molded body molded by an additive manufacturing method, and is characterized in that: a raw material therefor is an aluminum material containing 0.001 to 2.5% by mass of a transition metal element that forms a eutectic crystal with Al, with the remainder being Al and unavoidable impurities; a thermal conductivity is 180 W/mK or more. Hereinafter, the composition, structure and various physical properties of the aluminum molded body will be described in detail.

(1) Composition

The raw material of the aluminum molded body of the present invention is the aluminum material containing 0.001 to 2.5% by mass of a transition metal element that forms a eutectic crystal with Al, with the remainder being Al and unavoidable impurities. Hereinafter, the component elements will be described.

Transition Metal Element

Fe: 0.001 to 2.5% by Mass

When containing 0.001% by mass or more of Fe, it is possible to increase the strength and hardness of the aluminum molded body and improve the thermal stability due to formation of the AlFe-based compound. Further, when setting the Fe content to 2.5% by mass or less, it is possible to suppress the reduction of thermal conductivity of the aluminum molded body, and also suppress the reduction of strength and hardness caused by the coarsening of the AlFe-based compound. The Fe content is preferably 0.15 to 2.0% by mass, more preferably 0.5 to 1.5% by mass.

The transition metal element is not particularly limited as long as the effect of the present invention is not impaired, and various conventionally known transition metal elements can be used. Examples of the transition metal element other than Fe include Ni, Co, and the like.

Further, examples of unavoidable impurities in the aluminum molded body of the present invention include Si, Cu, Mn, Mg, Zn, Cr and Ti.

(2) Structure

Figure 1:
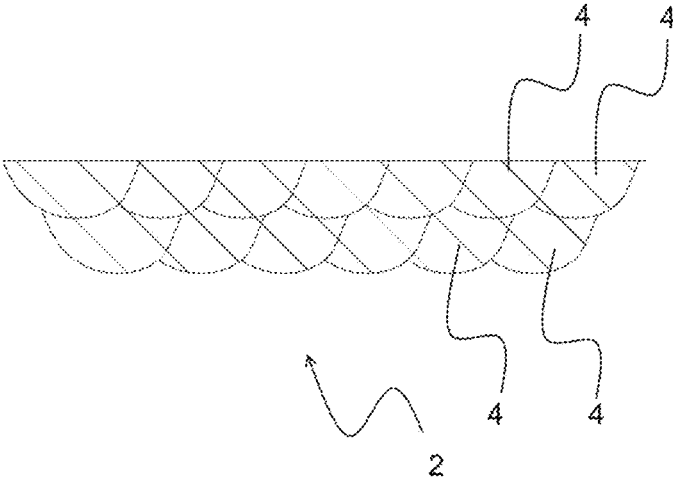
FIG. 1 is a schematic diagram of the cross-sectional macrostructure of the aluminum molded body of the present invention.

FIG. 1 schematically shows the cross-sectional macrostructure of the aluminum molded body of the present invention. Hereinafter, the case where the transition metal element is Fe will be described in detail. The aluminum molded body 2 of the present invention is formed by the additive manufacturing method, and has a macrostructure in which a plurality of melt pools 4 are joined.

The number of melt pools 4 in the vertical and horizontal directions of the aluminum molded body 2 is not particularly limited as long as the effect of the present invention is not impaired, and the aluminum molded body 2 may be appropriately adjusted to have a desired size and shape.

Further, the size and shape of the melt pool 4 are not particularly limited, but as the melt pool 4 becomes larger, the cooling rate at the time of solidification decreases. That is, from the viewpoint of refining the crystal grains of the aluminum molded body 2 and miniaturizing the AlFe-based compound, it is preferable to reduce the size of the melt pool 4 so that the cooling rate increases. Further, reduction of the size of the melt pool 4 itself can increase the strength of the aluminum molded body 2 and homogenize the aluminum molded body 2. On the other hand, when the melt pool 4 is made too small, the number of melt pools 4 required for forming the aluminum molded body 2 increases, and therefore, from the viewpoint of production efficiency, it is preferable to increase the size of the melt pool 4, as long as the AlFe-based compound is sufficiently miniaturized.

It is preferable that the AlFe-based compound having an average particle size of 20 to 100 nm is uniformly dispersed in the melt pool 4. When setting the average particle size of the AlFe-based compound to 20 to 100 nm, it is possible to efficiently inhibit the movement of dislocations and increase the strength and hardness of the aluminum molded body 2. Further, though the coarse AlFe-based compound exhibits brittle properties and causes a decrease in toughness and ductility of the aluminum molded body 2, when setting the average particle size to 100 nm or less, these adverse effects can be suppressed.

Here, the more preferable average particle size of the AlFe-based compound is 20 to 70 nm, and the most preferable average particle size is 20 to 40 nm. Although there is a case that the AlFe-based compound may be coarsened in the boundary region of the melt pool 4, the target with respect to the "average particle size of the AlFe-based compound" in the present specification is the AlFe-based compounds being present inside the melt pool 4, which occupies most of the aluminum molded body 2.

The method for determining the average particle size of the AlFe-based compound is not particularly limited as long as the effect of the present invention is not impaired, and various conventionally known methods may be used for measurement. For example, the distance and the average particle size can be obtained by cutting the aluminum molded body 2 at an arbitrary cross section, observing the obtained cross-sectional sample with a scanning electron microscope, and then calculating the average value of the particle size of the AlFe-based compound inside the melt pool 4. Depending on the observation method, the cross-sectional sample may be subjected to mechanical polishing, buffing, electrolytic polishing, etching or the like.

(3) Physical Properties

The thermal conductivity of the aluminum molded body 2 is 180 W/mK or more. The preferable thermal conductivity is 190 W/mK or more, the more preferable thermal conductivity is 200 W/mK or more, and the most preferable thermal conductivity is 210 W/mK or more. In the aluminum molded body 2 of the present invention, since Fe forms a fine AlFe-based compound, Fe is homogeneously removed from the aluminum base material. In addition, the strain of the aluminum base material is significantly reduced in the process of forming the AlFe-based compound, and thus, the high thermal conductivity is realized by these effects.

Further, the Vickers hardness of the aluminum molded body 2 is preferably 30 to 90 HV. The more preferable Vickers hardness is 40 to 90 HV, and the most preferable Vickers hardness is 50 to 90 HV. Although the thermal conductivity is improved by heat-treating the aluminum molded body which is obtained by the additive manufacturing method, the mechanical properties such as Vickers hardness are lowered when the AlFe-based compound is coarsened. Here, in order to achieve both thermal conductivity and Vickers hardness at high values, the Vickers hardness is preferably 30 to 65 HV, more preferably 40 to 65 HV, and most preferably 50 to 65 HV.

Further, in the aluminum molded body 2, it is preferable that the decrease in Vickers hardness when kept at 400 to 500° C. for 1 hour is 5 HV or less. The aluminum molded body 2 has good thermal stability due to the uniform dispersion of the fine AlFe-based compounds. Since the decrease in Vickers hardness when held at 400 to 500° C. for 1 hour is 5 HV or less, it is possible to be suitably used even in applications where keeping at a high temperature.

Furthermore, the aluminum molded body 2 preferably has tensile strength: 100 MPa or more, 0.2% proof stress: 75 MPa or more. The more preferable tensile strength is 150 MPa or more, and the most preferable tensile strength is 200 MPa or more. Further, the more preferable 0.2% proof stress is 100 MPa or more, and the most preferable 0.2% proof stress is 150 MPa or more. Furthermore, the more preferable elongation is 10% or more, and the most preferable elongation is 15% or more. In the aluminum molded body 2, since the extremely fine AlFe-based compounds are uniformly dispersed, the aluminum molded body has excellent tensile properties as compared with a rolled material having the same composition. Since the aluminum molded body 2 has these tensile properties, it is possible to be suitably used in applications where strength and reliability are required.

2. Method for Producing the Aluminum Molded Body

The method for producing the aluminum molded body includes the lamination molding step of using an aluminum material containing a slight amount of a transition metal element as a raw material to obtain an aluminum laminated molded body by an additive manufacturing method; and the heat treatment step of precipitating a compound composed of Al and the transition metal element and reducing residual stress. Hereinafter, each step will be described in detail by showing a representative case where the transition metal element is Fe.

(1) Lamination Molding Step

The lamination molding step is a step of using an aluminum material containing 0.001 to 2.5% by mass of a transition metal element which forms a eutectic crystal with Al, with the remainder being Al and unavoidable impurities as a raw material and obtaining an aluminum laminated molded body by an additive manufacturing method.

The additive manufacturing method is a method of stacking and processing melt-solidified regions one by one based on two-dimensional (slice) data obtained from 3D-CAD data. In the method for producing the aluminum molded body of the present invention, for example, an aluminum powder is used as a raw material, and the deposited metal powder is melt-solidified by irradiation with a laser or the like and laminated by one layer to give a three-dimensional molded body.

The additive manufacturing method is not particularly limited as long as the effect of the present invention is not impaired, and various conventionally known additive manufacturing methods can be used. Further, the heat source for melting the raw metal is not particularly limited as long as the effect of the present invention is not impaired, and various conventionally known heat sources can be used, and for example, a laser or an electron beam can be preferably used.

Here, since aluminum is difficult to absorb a laser and heat is easily diffused due to its high thermal conductivity, it is difficult to obtain an aluminum molded body having a high density by the additive manufacturing method. Therefore, in order to increase the density of the aluminum molded body 2, it is preferable to use a laser having a short wavelength, and for example, a Yb fiber laser can be suitably used.

(2) Heat Treatment Step

The heat treatment step is a step for heat-treating the aluminum laminated molded body obtained by using the additive manufacturing method at an appropriate temperature to precipitate the AlFe-based compounds and to reduce residual stress.

When molding an aluminum material containing 0.001 to 2.5% by mass of Fe by an additive manufacturing method, a quenched and solidified structure made of an aluminum base material in which the Fe is solid-dissolved is formed. After that, when maintaining the aluminum laminated molded body at 325 to 525° C., it is possible to precipitate the AlFe-based compound further and to reduce the residual stress. The holding time may be appropriately adjusted according to the size and shape of the aluminum laminated molded body, and is preferably 30 minutes to 5 hours.

When setting the heat treatment temperature to 325° C. or higher, the fine AlFe-based compounds are sufficiently precipitated, and the thermal conductivity of the aluminum molded body can surely be increased. Further, when setting the heat treatment temperature to 525° C. or lower, it is possible to suppress coarsening of the AlFe-based compound and prevent reducing of mechanical properties such as Vickers hardness of the aluminum molded body. The more preferable heat treatment temperature is 350 to 550° C., and the most preferable heat treatment temperature is 400 to 450° C.

For example, when the Fe content is approximately 1.0% by mass, the thermal conductivity can be 180 W/mK or more by setting the heat treatment temperature to 325° C. or higher, and the Vickers hardness can be 40 HV or more by setting the heat treatment temperature to 525° C. or lower. Further, for example, when the Fe content is approximately 2.5% by mass, the thermal conductivity can be 180 W/mK or more by setting the heat treatment temperature to 400° C. or higher, and the Vickers hardness can be set to 50 HV or more by setting the heat treatment temperature to 525° C. or lower.

Although the typical embodiments of the present invention have been described above, the present invention is not limited to these, and various design changes are possible, and all of these design changes are included in the technical scope of the present invention.

EXAMPLE

Example

An aluminum molded body was obtained by using an aluminum powder of a 50% particle size of 40 to 50 μm having a composition (% by mass) shown in TABLE 1 as a raw material by an additive manufacturing method of a powder bed melt-bonding method using a laser. The modeling machines used for lamination modeling are ProX320 available from 3D Systems and LUMEX Avance-25 available from Matsuura Machinery Co., Ltd. equipped with a Yb fiber laser.

TABLE 1

|  | Si | Fe | Al |
|---|---|---|---|
| Ex. 1 | 0.06 | 0.10 | Bal. |
| Ex. 2 | 0.12 | 1.10 | Bal. |
| Ex. 3 | 0.12 | 2.38 | Bal. |
| Com. Ex. 1 | 0.11 | 4.81 | Bal. |

More specifically, the aluminum molded body was obtained under the lamination conditions of laser output: 320 to 460 W, scanning speed: 700 to 1200 mm/s, scanning pitch: 0.10 to 0.18 mm, and atmosphere: inert gas.

Next, the obtained aluminum molded body was held in the air at each temperature of 300° C., 350° C., 400° C., 450° C., 475° C., 500° C., 525° C., and 550° C. for 1 hour.

Evaluation Test (1) Microstructure

A sample for cross-section observation was cut out from the obtained aluminum molded body and subjected to mirror polishing to prepare a sample for structure observation. An optical microscope and a scanning electron microscope (ULTRA Plus type, available from Carl Zeiss) were used for the observation, and the macrostructure of the cross section and the AlFe-based compound dispersed in the melt pool were observed.

(2) Vickers Hardness Measurement

A cross-sectional sample was prepared in the same manner as in (1), and the Vickers hardness was measured. The measurement was performed with a measured load of 5 kgf and a holding time of 15 s.

(3) Tensile Test

A No. 14A test piece defined in JIS-Z2241 was collected from the obtained aluminum molded body and subjected to a tensile test at room temperature. The crosshead speed during the tensile test was 0.1 to 0.5 mm/min up to 0.2% proof stress, and 5 mm/min after 0.2% proof stress.

(4) Thermal Conductivity

The thermal conductivity was measured by the laser flash method by using a thermal conductivity measuring device (thermal constant measuring device TC-9000 type, available from Albac Riko). The test piece for measuring thermal conductivity was φ10 mm, and both sides of the disk were polished to a thickness of about 2 mm.

Comparative Example

An aluminum molded body was obtained in the same manner as in Examples except that the aluminum powder having the compositions shown in Comparative Example 1 in TABLE 1 was used as a raw material. Further, the heat treatment was performed in the same manner as in Example, and the obtained aluminum molded body was evaluated in the same manner as in Example.

Figure 2:
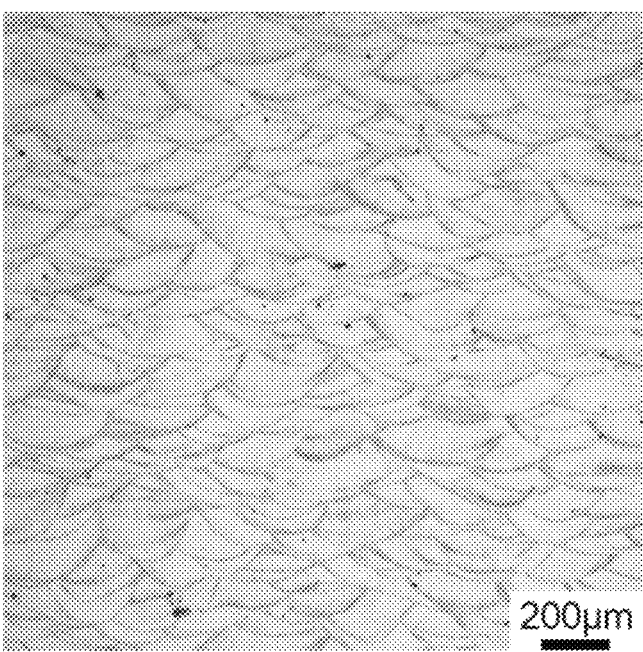
FIG. 2 is a cross-section macro observation result of the aluminum molded body (as is laminated) of Example 2.
Figure 3:
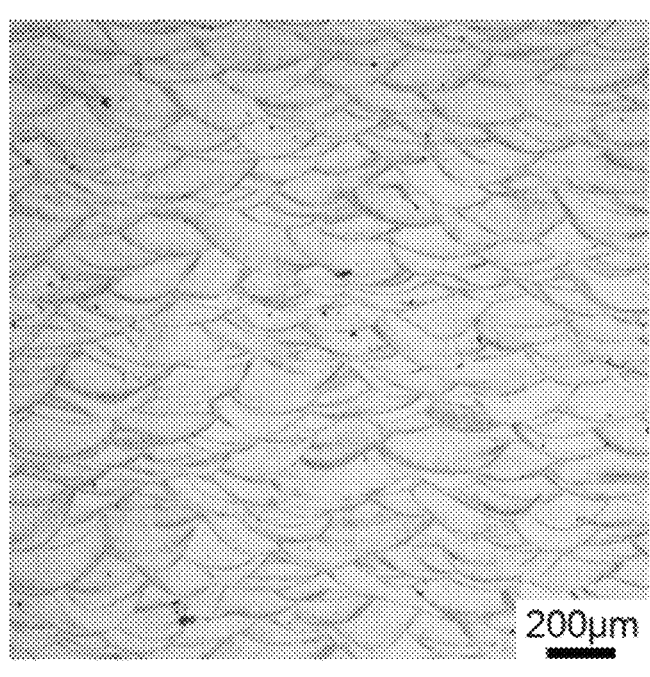
FIG. 3 is a cross-sectional macro observation result of the aluminum molded body (as is laminated) of Example 3.

The cross-sectional macro photographs of the aluminum molded bodies of Example 2 and Example 3 (as they are laminated) are shown in FIG. 2 and FIG. 3, respectively. It can be seen that each aluminum molded body is formed by joining a large number of melt pools. In addition, no significant defects were observed, and it can be confirmed that a dense aluminum molded body was obtained.

Figure 4:
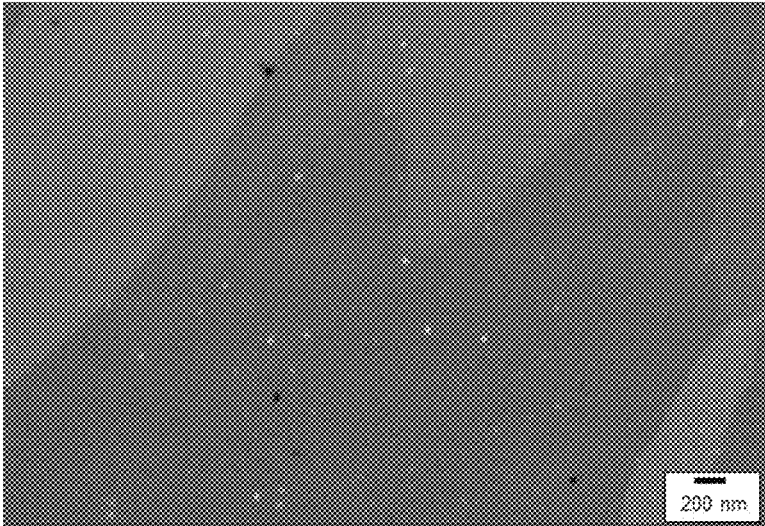
FIG. 4 is the SEM observation result in the melt pool of the aluminum molded body (as is laminated) of Example 1.
Figure 5:
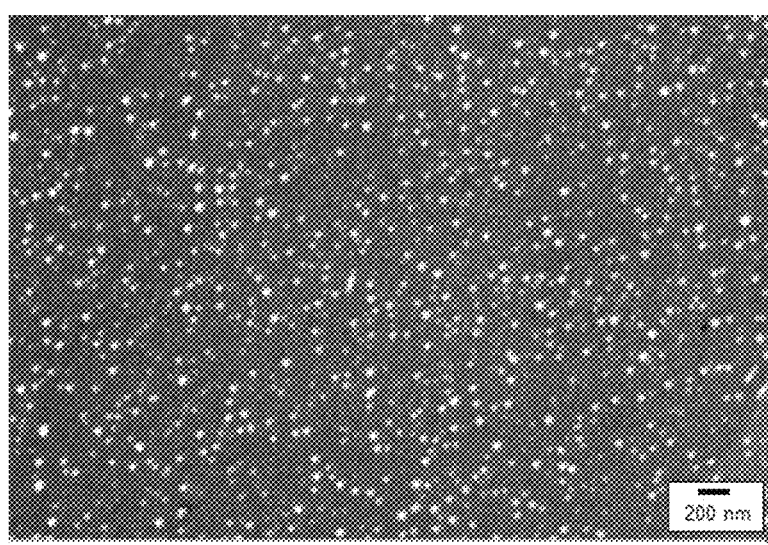
FIG. 5 is the SEM observation result in the melt pool of the aluminum molded body (as is laminated) of Example 2.
Figure 6:
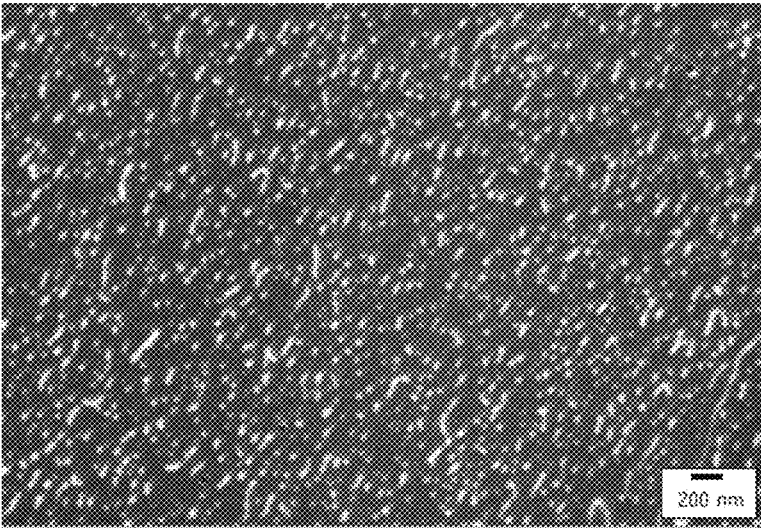
FIG. 6 is the SEM observation result in the melt pool of the aluminum molded body (as is laminated) of Example 3.

The observation results of the AlFe-based compound in the melt pool of the aluminum molded bodies of Example 1, Example 2 and Example 3 (as they are laminated) are shown in FIG. 4, FIG. 5 and FIG. 6, respectively. In each aluminum molded body, extremely fine AlFe-based compounds are uniformly dispersed in a large amount, and in every case, the average particle size of the AlFe-based compounds is 20 to 100 nm.

Figure 7:
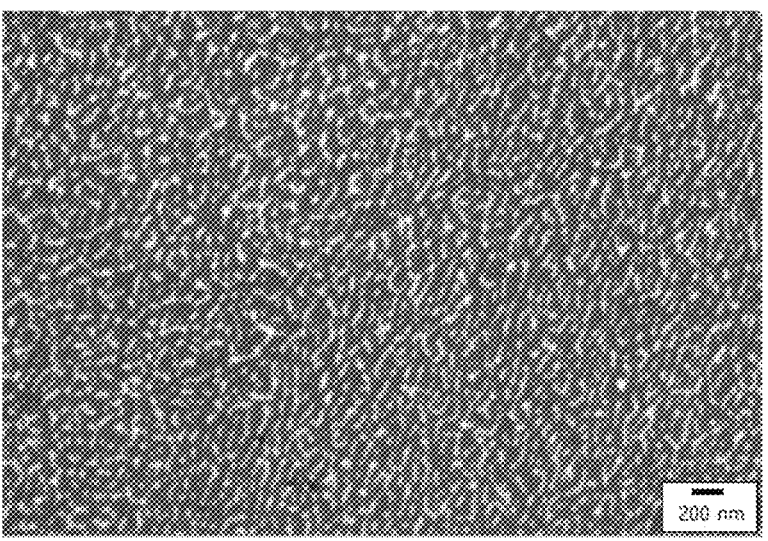
FIG. 7 is the SEM observation result in the melt pool of the aluminum molded body (as is laminated) of Comparative Example 1.

The observation result of the AlFe-based compound in the melt pool of the aluminum molded body (as it is laminated) of Comparative Example 1 is shown in FIG. 7. It can be seen that the AlFe-based compound is grown and linked, and is coarsened as compared with the aluminum molded bodies obtained in Examples.

The thermal conductivity and Vickers hardness of the aluminum molded bodies of Example 1, Example 2 and Example 3 are shown in TABLE 2. With respect to Example 2 and Example 3 in which the Fe content is relatively high, the Vickers hardness is increased by the heat treatment at 300° C. and 350° C., and the thermal conductivity is also increased. Further, the thermal conductivity can be further improved by the heat treatment at a higher temperature. With respect to Example 1 in which the Fe content is low, extremely high thermal conductivity is shown. Furthermore, the thermal conductivity is further increased by the heat treatment. The Vickers hardness is slightly reduced by the heat treatment, but even when the heat treatment is performed at 525° C. for 1 hour, the decrease from the laminated molding remains at around 5 HV.

US 12,564,878 B2

11

TABLE 2

| | Heat treating conditions | Thermal conductibity (W/mK) | Vickers hardness (HV) |
|---|---|---|---|
| Ex. 1 | as-built | 214 | 34.5 |
| | 350° C. × 1 h | 217 | 33.6 |
| | 450° C. × 1 h | 225 | 32.0 |
| | 475° C. × 1 h | 224 | 30.4 |
| | 500° C. × 1 h | 224 | 29.6 |
| | 525° C. × 1 h | 225 | 29.2 |
| Ex. 2 | as-built | 172 | 60.3 |
| | 300° C. × 1 h | — | 63.9 |
| | 350° C. × 1 h | 198 | 62.4 |
| | 400° C. × 1 h | 202 | 59.2 |
| | 450° C. × 1 h | 204 | 52.9 |
| | 500° C. × 1 h | 209 | 47.0 |
| | 550° C. × 1 h | — | 42.4 |
| Ex. 3 | as-built | 149 | 79.4 |
| | 300° C. × 1 h | — | 88.6 |
| | 350° C. × 1 h | 179 | 84.1 |
| | 400° C. × 1 h | 192 | 80.2 |
| | 450° C. × 1 h | 195 | 67.2 |
| | 500° C. × 1 h | 198 | 58.3 |
| | 550° C. × 1 h | — | 52.0 |

The tensile properties of the aluminum molded bodies of Example 1, Example 2, Example 3 and Comparative Example 1 (as they are laminated) are shown in TABLE 3. Each of the aluminum molded bodies obtained in Examples shows high tensile properties of tensile strength: 100 MPa or more, 0.2% proof stress: 75 MPa or more, elongation: 5% or more. On the other hand, the aluminum molded body of Comparative Example 1 has high strength and proof stress, but has a low elongation. The relative densities of the aluminum molded body are Example 1: 99.8%, Example 2: 98.8%, Example 3: 98.9% and Comparative Example 1: 99.8%.

TABLE 3

| | Tensile strength (MPa) | 0.2% Proof stress (MPa) | Elongation (%) |
|---|---|---|---|
| Ex. 1 | 103.8 | 84.2 | 28.0 |
| Ex. 2 | 195.0 | 166.0 | 9.7 |
| Ex. 3 | 265.0 | 222.0 | 5.1 |
| Com. Ex. 1 | 422.0 | 355.0 | 2.3 |

Figure 8:
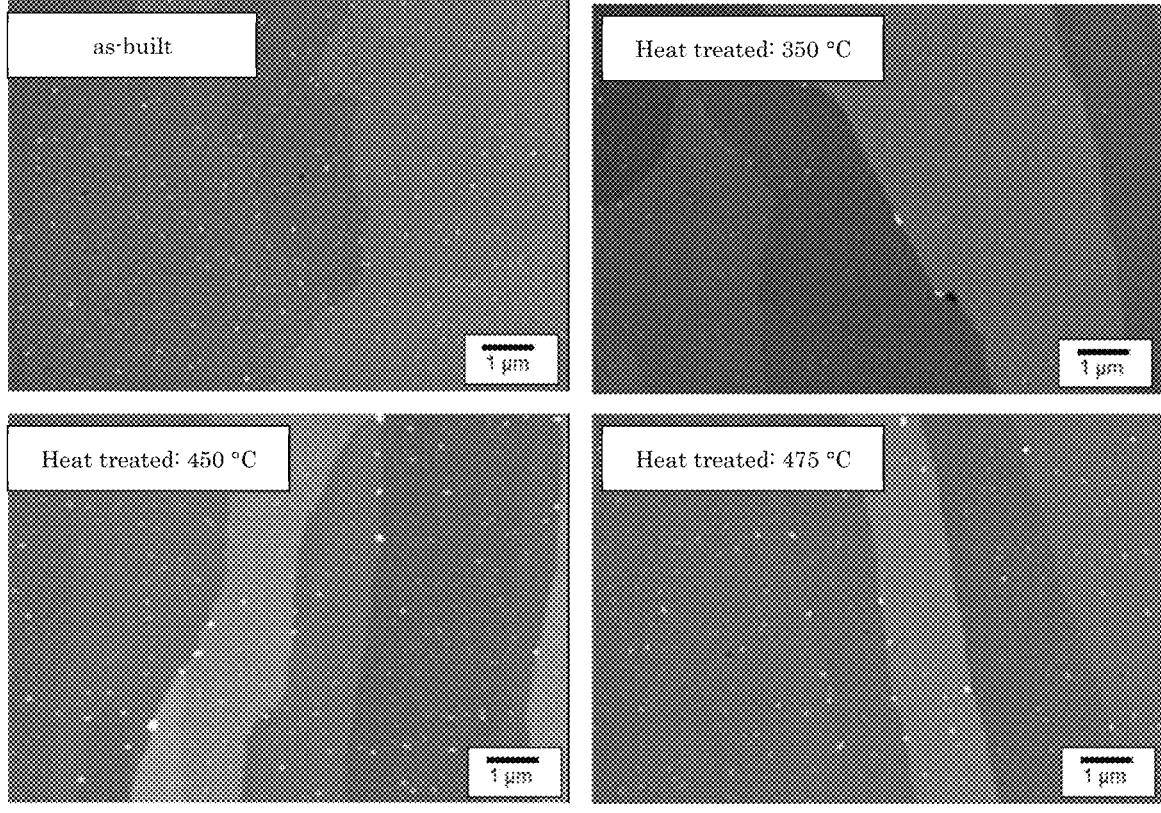
FIG. 8 is the SEM observation result in the melt pool after heat-treating the aluminum molded body obtained in Example 1 at each temperature.

With respect to the aluminum molded body obtained in Example 1, the observation results of the AlFe-based compound in the melt pool after heat-treating at each temperature is shown in FIG. 8. After the heat treatment, the AlFe-based compound maintains a fine state, and the average particle size is 20 to 100 nm.

Figure 9:
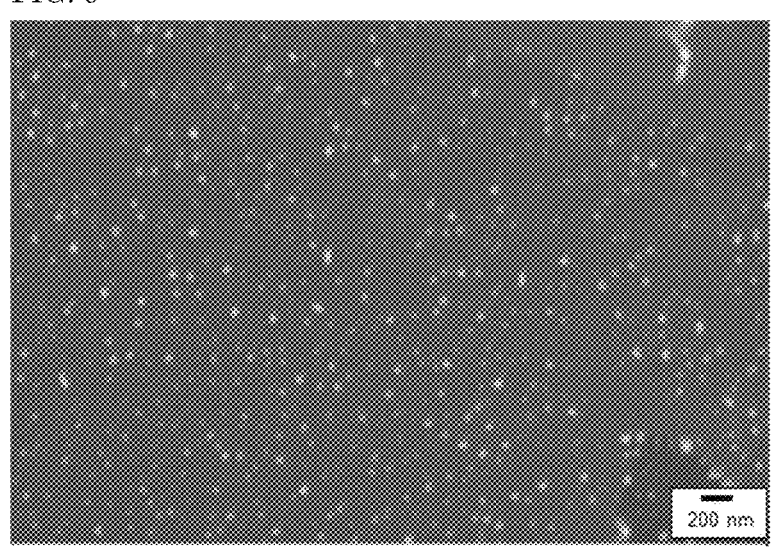
FIG. 9 is the SEM observation result in the melt pool after heat-treating the aluminum molded body obtained in Example 2 at 200° C. for 100 hours.

With respect to the aluminum molded body obtained in Example 2, the observation result of the AlFe-based compound in the melt pool after heat-treating the aluminum molded body obtained in Example 1 at 200° C. for 100 hours is shown in FIG. 9. After the long heat treatment, the AlFe-based compound maintains a fine state, and the average particle size is 20 to 100 nm.

EXPLANATION OF SYMBOLS

2 . . . Aluminum molded body,

4 . . . Melt pool.

The invention claimed is:

1. An aluminum molded body, which is an aluminum laminated molded body molded by an additive manufacturing method, which is characterized in that: a raw material therefor is an aluminum material consisting of 0.5 to 2.5% by mass of Fe that forms a eutectic crystal with Al, with the remainder being Al and unavoidable impurities; and a thermal conductivity thereof is 180 W/mK or more.

2. The aluminum molded body according to claim 1, wherein average particle size of the compound composed of Al and Fe in the region excluding the boundary portion of the melt pool is 20 to 100 nm.

3. The aluminum molded body according to claim 1, wherein the thermal conductivity is 190 W/mK or more.

4. The aluminum molded body according to claim 1, wherein the Vickers hardness is 30 to 90 HV.

5. The aluminum molded body according to claim 1, wherein the decrease in Vickers hardness when kept at 400 to 500° C. for 1 hour is 5 HV or less.

6. The aluminum molded body according to claim 1, wherein the aluminum molded body has tensile strength: 100 MPa or more, 0.2% proof stress: 75 MPa or more, and elongation: 5% or more.

7. The aluminum molded body according to claim 1, wherein the unavoidable impurities includes Si, Cu, Mn, Mg, Zn, Cr or Ti.

8. The aluminum molded body according to claim 1, wherein the unavoidable impurities includes Si and a content of Si in the aluminum material is 0.06 to 0.12% by mass.

9. A method for producing an aluminum molded body, which is characterized by including, a lamination molding step of molding an aluminum material consisting of 0.5 to 2.5% by mass of Fe which forms a eutectic crystal with Al, with the remainder being Al and unavoidable impurities by an additive manufacturing method to obtain an aluminum laminated molded body; and a heat treatment step of holding the aluminum laminated molded body at 325 to 525° C. to precipitate a compound composed of Al and Fe and to reduce residual stress, wherein a thermal conductivity of the aluminum molded body is 180 W/mK or more.

* * * * *